US010627334B2

(12) United States Patent
Poulter

(10) Patent No.: US 10,627,334 B2
(45) Date of Patent: Apr. 21, 2020

(54) APPARATUS FOR DETERMINING IDENTITY AND/OR QUANTITY OF A FUEL

(71) Applicant: MECHTRONIC LTD, Leeds, Yorkshire (GB)

(72) Inventor: Trevor John Poulter, Leeds (GB)

(73) Assignee: MECHTRONIC LTD, Leeds, Yorkshire (GB)

( * ) Notice: Subject to any disclaimer, the term of this patent is extended or adjusted under 35 U.S.C. 154(b) by 392 days.

(21) Appl. No.: 15/117,493

(22) PCT Filed: Feb. 10, 2015

(86) PCT No.: PCT/GB2015/050368
§ 371 (c)(1),
(2) Date: Aug. 9, 2016

(87) PCT Pub. No.: WO2015/118359
PCT Pub. Date: Aug. 13, 2015

(65) Prior Publication Data
US 2016/0356699 A1 Dec. 8, 2016

(30) Foreign Application Priority Data

Feb. 10, 2014 (GB) .................................. 1402266.9
Sep. 22, 2014 (GB) .................................. 1416728.2

(51) Int. Cl.
*G01N 19/00* (2006.01)
*G01F 23/14* (2006.01)
(Continued)

(52) U.S. Cl.
CPC ............. *G01N 19/00* (2013.01); *G01F 23/14* (2013.01); *G01F 23/162* (2013.01);
(Continued)

(58) Field of Classification Search
CPC ......... G08B 5/36; G01F 23/14; G01F 23/162; G01N 19/00; G01N 2021/054; G01N 21/251; G01N 21/8507
See application file for complete search history.

(56) References Cited

U.S. PATENT DOCUMENTS

| 4,471,656 A | 9/1984 | Sanders et al. |
| 4,637,729 A * | 1/1987 | Schoch ............. G01N 21/8507 250/227.25 |

(Continued)

FOREIGN PATENT DOCUMENTS

| DE | 3728042 A1 | 3/1989 |
| JP | 06174529 A | 6/1994 |

(Continued)

*Primary Examiner* — Randy W Gibson
*Assistant Examiner* — Gedeon M Kidanu
(74) *Attorney, Agent, or Firm* — Nexsen Pruet, LLC; E. Eric Mills

(57) ABSTRACT

An apparatus for determining the identity and/or quantity of a liquid fuel contained in a fuel transporting tank of a fuel transporting vehicle can comprise: a longitudinally extensive member having a first end and a second end, an internal volume from which liquid fuel in the tank is excluded, and a mounting arrangement configured for mounting in use of the longitudinally extensive member within and in fixed relation to the tank, said second end configured in use to be immersed in the liquid fuel in the tank. The longitudinally extensive member can further comprise: first and second pressure sensors spaced apart by a fixed distance, each said pressure sensor having a face exposed in use to the local hydrostatic pressure of the liquid fuel in the tank; and a colour sensing device comprising a light emitter and a light detector configured to detect light from the emitter, said emitter and detector being arranged such that in use light from the emitter incident on the detector passes through said liquid fuel in the tank. The apparatus can further comprise a (Continued)

data processing device configured to determine the identity of the liquid fuel based on said pressure measurements from said first and second pressure sensors and colour data from said colour sensing device.

11 Claims, 8 Drawing Sheets

(51) Int. Cl.
    *G01N 21/25*     (2006.01)
    *G01F 23/16*     (2006.01)
    *G01N 21/85*     (2006.01)
    *G01N 21/05*     (2006.01)

(52) U.S. Cl.
    CPC ....... *G01N 21/251* (2013.01); *G01N 21/8507* (2013.01); *G01N 2021/054* (2013.01)

(56) References Cited

U.S. PATENT DOCUMENTS

| | | | |
|---|---|---|---|
| 4,671,106 A | 6/1987 | Schroeder | |
| 4,857,894 A * | 8/1989 | Dahl | G08B 21/182 340/619 |
| 5,099,504 A * | 3/1992 | Pettit | G01B 15/025 378/54 |
| 5,942,980 A * | 8/1999 | Hoben | G01F 23/0076 340/614 |
| 6,164,325 A * | 12/2000 | Braun | B60K 15/061 123/509 |
| 8,297,119 B2 * | 10/2012 | Parkinson | G01F 23/185 73/299 |
| 9,000,905 B2 * | 4/2015 | Oxley | B60K 15/03006 340/438 |
| 2005/0172700 A1 | 8/2005 | Sugiura | |
| 2007/0251316 A1 * | 11/2007 | Mahadevaiah | G01F 23/14 73/299 |
| 2008/0231836 A1 * | 9/2008 | Curello | H01M 8/04089 356/72 |
| 2009/0216464 A1 * | 8/2009 | Kong | G01N 33/2847 702/25 |
| 2011/0187529 A1 * | 8/2011 | Maurer | G01F 23/68 340/540 |
| 2014/0202580 A1 * | 7/2014 | Hutchinson | B67D 7/342 141/1 |

FOREIGN PATENT DOCUMENTS

| | | |
|---|---|---|
| JP | 2010071733 A | 4/2010 |
| WO | 9927344 A1 | 6/1999 |
| WO | 2002066938 A1 | 8/2002 |
| WO | 2007004897 A1 | 1/2007 |
| WO | 2007085225 A1 | 8/2007 |

* cited by examiner

APPARATUS FOR DETERMINING IDENTITY AND/OR QUANTITY OF A FUEL

CROSS REFERENCE TO RELATED APPLICATIONS

This application is a 35 U.S.C. § 371 U.S. national phase entry of International Application No. PCT/GB2015/050368 having an international filing date of Feb. 10, 2015, which claims the benefit of Great Britain Application No. 1416728.2 filed Sep. 22, 2014, and Great Britain Application No. 1402266.9 filed Feb. 10, 2014, each of which is incorporated herein by reference in its entirety.

This disclosure relates to an apparatus for measuring or determining the identity of a fluid in a tank. The apparatus is in particular adapted to the determination of the identity of a hydrocarbon fuel contained in a tank and more especially to determining the identity of such a fuel when contained in a tank or tank compartment of a fuel transport vehicle such as a road tanker vehicle or a rail tanker vehicle. The disclosed apparatus can also be configured for determining a quantity of such fluid in a tank or tank compartment.

BACKGROUND

Vehicles which are specifically constructed and used for transporting and delivering hydrocarbon fuel, principally by road but also possibly by rail, often include a main tank portion which is divided into a plurality of discrete tank compartments in which different fuel types may be separately contained. Thus a first tank compartment may, for example, contain gasoline (petrol) and a second tank compartment may contain diesel. Further distinctions are possible in that, for example, different gasoline grades (standard or high octane) may be carried in different tank compartments on the same vehicle. In another example, fuels of the same type but which attract different rates of duty (tax) may be carried in different tank compartments of the same vehicle. By way of example, in the UK diesel fuel sold for certain uses (such as for agricultural vehicles) has a lower rate of tax than diesel sold to the general public, and to provide a distinction a colourant is added to the lower tax diesel fuel. Tank compartments of the vehicle may also be used to convey other fuels such as kerosene.

It is clearly important when a using vehicle having a plurality of tank compartments which may contain different fuels that, at the location of delivery, the correct fuel is dispensed so that mixing of different fuels is prevented. A typical scenario would be replenishment of the fuel tanks at a filling station (service station or gas station) where, for example, it is vital that gasoline contained in a tank compartment of the vehicle is not dispensed into a storage tank already containing some diesel fuel. It is therefore important for the vehicle operator to be able easily to ascertain or to check the identity of the fuel contained in a particular tank compartment of the vehicle before such fuel is dispensed. In other words, the operator must have means of knowing unambiguously the identity of the fuel contained in a given tank compartment of the vehicle before that fuel is dispensed.

It is noted that it is not commonly possible to distinguish between different fuel types by mere visual inspection. Also, any arrangements which require an operator to access the fuel (e.g. for sampling or insertion of measurement devices) through an access means (such as an openable and closeable lid) provided at the top of the tank are inherently disadvantageous because of the need for the operator to mount to the top of the tank, which can be a safety problem.

It is also advantageous to know the quantity of fuel in a tank compartment, for example for the purposes of determining how much fuel has been, or can be, dispensed from the compartment.

It can readily be appreciated that vehicles constructed for the transport and delivery of volatile hydrocarbon fuels must comply with strict safety requirements to prevent any possible ignition of the fuel, the consequences of which could be disastrous. These requirements apply in particular to any electrical equipment associated with the vehicle which must never be a possible source of ignition of the fuel. Legal and standards requirements determine other aspects of the construction of such vehicles, dealing for example with the strength of the tank and its ability to resist deformation and spillage in the event of an accident, provision for emergency services to drain fuel from the tank in an emergency situation, access requirements to the tank for inspection and maintenance, operating pressures and pressure relief arrangements and so on. It follows that constructional features and arrangements known for other goods conveyance containers or tanks may not be appropriate for use with hydrocarbon fuel tanks.

It is further noted that the fuel tank compartments of fuel delivery vehicles are frequently emptied and re-filled. Such emptying and re-filling can allow air to be mixed with the fuel contained in the tank compartment. Also, it is inevitable that the fuel contained within the tank compartment moves during transit, and such movement can be quite vigorous, depending on the motion of the vehicle. Such movement can also cause mixing of air (from the head space of the tank compartment) into the fuel. It follows that any measurement devices or the like inserted into or contained within the fuel tank compartment should be configured to withstand the motion of the fuel and operate correctly despite such motion, and more especially should remain effective and function correctly in the event that air becomes mixed in the fuel.

For the avoidance of doubt, the present disclosure is not concerned with devices intended to measure parameters such as quantity or identity of fuel contained in the fuel tank of a vehicle, or being dispensed into or from such a fuel tank. By "fuel tank" in this context is meant the tank or vessel of a vehicle provided for the purpose of supplying fuel to the engine of the vehicle and thus used for propulsion of the vehicle.

Devices for measuring the quantity of fluid in a compartment based on pressure measurements are, in general terms, known.

BRIEF SUMMARY OF THE DISCLOSURE

The present disclosure seeks to overcome or at least mitigate some of the problems of the prior art by providing a means by which the identity of a fuel in a tank compartment of a fuel transport vehicle can be identified. Advantageously the details of such identification can be presented to an operator remotely from the tank compartment itself, such as when the operator is standing on the ground adjacent the vehicle.

The present disclosure relates to a tank or tank compartment of the vehicle configured for transporting fuel from a first location to a second location. Fuel contained in the tank or tank compartment of the vehicle is not consumed in the process of transportation.

According to a first aspect of the present invention there is provided an apparatus for determining the identity and/or quantity of a liquid fuel contained in a fuel transporting tank of a fuel transporting vehicle, the apparatus comprising:

a longitudinally extensive member having a first end and a second end, and a mounting arrangement configured for mounting in use of the longitudinally extensive member within and in fixed relation to the tank such that an immersion portion of the longitudinally extensive member extending upwardly from said second end is immersed in the liquid fuel in the tank, said longitudinally extensive member defining an internal volume from which liquid fuel in the tank is, in use, excluded, wherein said member further comprises:

first and second pressure sensors spaced apart by a fixed distance, each said pressure sensor having a face exposed in use to the local hydrostatic pressure of the liquid fuel in the tank, and a colour sensing device comprising a light emitter and a light detector configured to detect light from the emitter, said emitter and detector being arranged such that in use light from the emitter incident on the detector passes through said liquid fuel in the tank;

the apparatus further comprising a data processing device configured to determine the identity of the liquid fuel based on said pressure measurements from said first and second pressure sensors and colour data from said colour sensing device.

In some preferred embodiments the first end of the longitudinally extensive member can be configured for attachment in use to a wall of the tank. That is, the mounting arrangement configured for mounting in use of the longitudinally extensive member within and in fixed relation to the tank can be provided at the said first end.

In some preferred embodiments the respective first and second pressure sensors can measure a pressure of the liquid fuel at a depth in the tank determined by their location and relative to a common reference pressure.

In some preferred arrangements, the first and second pressure sensors can include an internal face or side exposed to the said internal volume of the longitudinally extensive member.

In some preferred embodiments the tank can include a headspace and the common reference pressure is the pressure of the headspace.

In some preferred embodiments said internal volume can communicate in use externally of the longitudinally extensive member only with the headspace.

In some preferred arrangements said internal volume can extend continuously substantially from the first end of the longitudinally extensive member at least to a part of the longitudinally extensive member adjacent an interior side of a lowermost one of said first and second pressure sensors.

In some preferred embodiments the apparatus can further comprise a conduit extending in said internal volume from an internal side of the respective pressure sensors and having an opening arranged at an upper part of said internal volume by which the conduit interior is open to the internal volume. Said opening can preferably the only means by which the conduit communicates with the internal volume.

In some preferred embodiments said conduit can comprise a pipe or tube section which extends in said internal volume from a lower part to an upper part thereof.

In some preferred embodiments the longitudinally extensive member can comprise at least one wall having any outer surface defining the outer surface of the longitudinally extensive member and an inner surface defining said internal volume.

In some preferred embodiments said wall can be generally cylindrical.

In some preferred embodiments the apparatus can further comprise
a skirt portion secured in fixed relation to an upper part of said longitudinally extensive member, said skirt portion surrounding said upper part of said longitudinally extensive member to define a circumferential gap between an internal surface of the skirt portion and an external surface of the longitudinally extensive member, said circumferential gap being open to the exterior of the longitudinally extensive member only at a local opening, and an aperture formed at an upper part of said longitudinally extensive member by which aperture the internal volume is in communication with said circumferential gap.

When the longitudinally extensive member is arranged in its position of use such that the immersion portion thereof is immersed in the liquid fuel, an upper portion of the exterior of the longitudinally extensive member can be exposed to a headspace within the tank compartment above the surface of the liquid fuel. In particular, said circumferential gap can communicate with the headspace.

In preferred arrangements, liquid fuel can be excluded from the internal volume of the longitudinally extensive member in the sense that there is no direct passage for liquid fuel to flow from the body of liquid fuel in the tank to the internal volume, except—exceptionally—via the circumferential gap. The circumferential gap and associated aperture can preferably be constructed such any transfer of liquid fuel from the body of fuel in the tank to the internal volume via the circumferential gap is minimal or non-existent. The possibility nevertheless exists that small amounts of fuel vapour from the headspace could travel via the circumferential gap and the associated aperture to the internal volume and condense in the internal volume. Very minor amounts of liquid fuel may therefore be present in the internal volume, as a result of such vapour condensation, such amounts being negligible and not affecting operation of apparatus of this aspect of the invention.

In some preferred embodiments said local opening can be arranged distal from said aperture formed at an upper part of said longitudinally extensive member, said internal volume and said headspace being in communication in use along a pathway extending through said aperture and within said circumferential gap to said local opening.

In some preferred embodiments said skirt portion can comprise opposed first and second end portions, said aperture formed at an upper part of said longitudinally extensive member being arranged proximate a first end of the skirt portion and said local opening being arranged at or proximate said second end.

In some preferred embodiments said skirt portion can be substantially cylindrical and said circumferential gap is substantially annular.

In some preferred embodiments said local opening can be defined between a lowermost edge of the skirt portion and an adjacent part of the external surface of the longitudinally extensive member.

In some preferred embodiments the apparatus can further comprise at least one barrier ring arranged in said circumferential gap, the, or each, barrier ring being in contacting relation with the internal surface of the skirt portion and the external surface of the longitudinally extensive member and defining an aperture or gap by which portions of the circumferential gap on respective sides of the barrier ring communicate.

In some preferred embodiments the apparatus can comprise a plurality of barrier rings. The barrier rings can preferably be spaced apart with respect to the longitudinal dimension of the longitudinally extensive member. In some preferred arrangements the respective apertures or gaps of the barrier rings can be rotationally offset.

In some preferred embodiments the apparatus can further comprise a mounting head assembly securable to an external part of said fuel transporting tank and by which the longitudinally extensive member can be mounted to the fuel transporting tank.

In some preferred embodiments said mounting head assembly can include a boss portion directed inwardly with respect to the transporting tank and wherein said longitudinally extensive member is mounted to said boss portion.

In some preferred embodiments said boss portion can include an aperture opening to said internal volume of the longitudinally extensive member and through which said internal volume can communicate with the aperture formed at an upper part of said longitudinally extensive member.

According to a second aspect of the invention there is provided an apparatus for determining the identity and/or quantity of a liquid fuel contained in a fuel transporting tank of a fuel transporting vehicle, the apparatus comprising:

a longitudinally extensive member having a first end and a second end, and a mounting arrangement configured for mounting, in use, of the longitudinally extensive member within and in fixed relation to the tank such that an immersion portion of the longitudinally extensive member extending upwardly from said second end is immersed in the liquid fuel in the tank, said longitudinally extensive member defining an internal volume from which liquid fuel in the tank is, in use, excluded, wherein said member further comprises:

first and second pressure sensors spaced apart by a fixed distance, and each having a face exposed in use to the local hydrostatic pressure of liquid fuel in the fuel transporting tank, the respective first and second pressure sensors being configured to measure a pressure of the liquid fuel at a depth in the fuel transporting tank determined by their location and relative to a pressure of said internal volume of the longitudinally extensive member;

a cover member arranged in confronting relation to an external surface of an upper portion of the longitudinally extensive member, the cover member and the said external surface defining therebetween a through passage extending from a local opening at a lower part of said cover member to an aperture formed at an upper part of said longitudinally extensive member by which aperture the internal volume is in communication with said through passage, the exterior of the longitudinally extensive member and the internal volume communicating via said through passage and said aperture formed at an upper part of said longitudinally extensive member such that the pressure of the internal volume is the same as the pressure of the exterior of the longitudinally extensive member.

In some preferred arrangements, the through passage is indirect. Thus, in these embodiments the through passage does not follow a linear path from the local opening to the aperture. The through passage is in some preferred embodiments of limited or restricted dimension. These constructions can each have the advantage of deterring or preventing the movement of liquid fuel from the tank via the through passage while permitting the flow of gas and/or vapour.

In some preferred embodiments the cover member can be in the form of a skirt portion secured in fixed relation to an upper part of said longitudinally extensive member, said skirt portion surrounding said upper part of said longitudinally extensive member. The through passage can in these embodiments be in the form of a circumferential gap between an internal surface of the skirt portion and an external surface of the longitudinally extensive member, said circumferential gap being open to the exterior of the longitudinally extensive member only at said local opening.

According to a third aspect of the present invention there is provided an apparatus for determining the identity and/or quantity of a liquid fuel contained in a fuel transporting tank of a fuel transporting vehicle, the apparatus comprising:

a longitudinally extensive member having a first end and a second end, and a mounting arrangement configured for mounting, in use, of the longitudinally extensive member within and in fixed relation to the tank such that an immersion portion of the longitudinally extensive member extending upwardly from said second end is immersed in the liquid fuel in the tank, said longitudinally extensive member defining an internal volume from which liquid fuel in the tank is, in use, excluded, wherein said member further comprises:

first and second pressure sensors spaced apart by a fixed distance, and each having a face exposed in use to the local hydrostatic pressure of liquid fuel in the fuel transporting tank, the respective first and second pressure sensors being configured to measure a pressure of the liquid fuel at a depth in the fuel transporting tank determined by their location and relative to a pressure of said internal volume of the longitudinally extensive member;

a skirt portion secured in fixed relation to an upper part of said longitudinally extensive member, said skirt portion surrounding said upper part of said longitudinally extensive member to define a circumferential gap between an internal surface of the skirt portion and an external surface of the longitudinally extensive member, said circumferential gap being open to the exterior of the longitudinally extensive member only at a local opening, and an aperture formed at an upper part of said longitudinally extensive member by which aperture the internal volume is in communication with said circumferential gap, the exterior of the longitudinally extensive member and the internal volume communicating via said circumferential gap and said aperture formed at an upper part of said longitudinally extensive member such that the pressure of the internal volume is the same as the pressure of the exterior of the longitudinally extensive member.

In some preferred arrangements, the first and second pressure sensors can include an internal face or side exposed to the said internal volume of the longitudinally extensive member.

In some preferred arrangements said internal volume can extend continuously substantially from the first end of the longitudinally extensive member at least to a part of the longitudinally extensive member adjacent an interior side of a lowermost one of said first and second pressure sensors.

When the longitudinally extensive member is arranged in its position of use such that the immersion portion thereof is immersed in the liquid fuel, an upper portion of the exterior of the longitudinally extensive member can be exposed to a headspace within the tank compartment above the surface of the liquid fuel. In particular, said circumferential gap can communicate with the headspace.

In preferred arrangements, liquid fuel can be excluded from the internal volume of the longitudinally extensive member in the sense that there is no direct passage for liquid fuel to flow from the body of liquid fuel in the tank to the internal volume, except—exceptionally—via the through passage. The through passage and associated aperture can preferably be constructed such any transfer of liquid fuel from the body of fuel in the tank to the internal volume via the through passage is minimal or non-existent. The possibility nevertheless exists that small amounts of fuel vapour from the headspace could travel via the through passage and the associated aperture to the internal volume and condense in the internal volume. Very minor amounts of liquid fuel may therefore be present in the internal volume, as a result of such vapour condensation, such amounts being negligible and not affecting operation of apparatus of this aspect of the invention. Here, where the cover member is a skirt portion, references to the through passage are references to the circumferential gap.

In some preferred embodiments of the second or third aspects of the invention said first end of said longitudinally extensive member can be attached to a wall of the fuel transporting tank.

In some preferred embodiments of the second or third aspects of the invention said local opening can be arranged distal from said an aperture formed at an upper part of said longitudinally extensive member, said internal volume and said headspace being in communication in use along a pathway extending through said aperture and within said through passage (or circumferential gap) to said local opening.

In some preferred embodiments of the second or third aspects of the invention said skirt portion can comprise opposed first and second end portions, said aperture formed at an upper part of said longitudinally extensive member being arranged proximate a first end of the skirt portion and said local opening being arranged at or proximate said second end.

In some preferred embodiments of the second or third aspects of the invention said skirt portion can be substantially cylindrical and said circumferential gap can be substantially annular.

In some preferred embodiments of the second or third aspects of the invention said local opening can be defined between a lowermost edge of the skirt portion and an adjacent part of the external surface of the longitudinally extensive member.

In some preferred embodiments of the second or third aspects of the invention the apparatus can further comprise at least one barrier ring arranged in said circumferential gap, the, or each, barrier ring being in contacting relation with the internal surface of the skirt portion and the external surface of the longitudinally extensive member and defining an aperture or gap by which portions of the circumferential gap on respective sides of the barrier ring communicate.

In some preferred embodiments the apparatus can comprise a plurality of barrier rings. The barrier rings can preferably be spaced apart with respect to the longitudinal dimension of the longitudinally extensive member. In some preferred arrangements the respective apertures or gaps of the barrier rings can be rotationally offset.

In some preferred embodiments of the second or third aspects of the invention the apparatus can further comprise a mounting head assembly securable to an external part of said fuel transporting tank and by which the longitudinally extensive member can be mounted to the fuel transporting tank.

In some preferred embodiments of the second or third aspects of the invention said mounting head assembly can include a boss portion directed inwardly with respect to the transporting tank and wherein said longitudinally extensive member is mounted to said boss portion.

In some preferred embodiments of the second or third aspects of the invention said boss portion can include an aperture opening to said internal volume of the longitudinally extensive member and through which said internal volume can communicate with the aperture formed at an upper part of said longitudinally extensive member.

In some preferred embodiments of the second or third aspects of the invention the apparatus can further comprise a data processing device configured to determine one or both of the identity of the fuel and the quantity of fuel in the tank based on said pressure measurements from said first and second pressure sensors.

In some preferred embodiments of the second or third aspects of the invention the apparatus can further comprise a colour sensing device comprising a light emitter and a light detector configured to detect light from the emitter, said emitter and detector being arranged such that in use light from the emitter which is incident on the detector passes through said fuel in the tank.

In some preferred embodiments of the second or third aspects of the invention said data processing device can be configured to determine the identity of the fuel based on said pressure measurements from said first and second pressure sensors and said colour sensing device.

In some further preferred embodiments of the invention, at least one of (i) a liquid fuel contacting surface of a pressure sensor and/or of a colour sensing device and (ii) sensor surrounding areas of the longitudinally extensive member can be configured to permit (or more preferably to promote) flow of air bubbles or air pockets away from the liquid fuel contacting surface. Build-up of air bubbles or pockets of air at the liquid fuel contacting surface of the respective sensors can thereby be reduced or eliminated.

According to a fourth aspect of the present invention there is provided a tank compartment of a vehicle for the conveyance and delivery of fuel, said tank compartment comprising therein an apparatus according to the first or second aspects of the invention.

According to a fifth aspect of the present invention there is provided a fuel conveying and delivery vehicle having a tank compartment for the conveyance and delivery of fuel, said tank compartment comprising therein an apparatus according to the first or second aspects of the invention.

According to a sixth aspect of the present invention there is provided a fuel conveying and delivery vehicle comprising:

a tank compartment for the conveyance and delivery of fuel, the tank compartment containing in use a body of liquid fuel and having a headspace within the tank compartment above the surface of the liquid fuel, and apparatus for determining the identity and/or quantity of a liquid fuel contained in said tank compartment, the apparatus comprising:

a longitudinally extensive member having a first end and a second end and a mounting arrangement by which the longitudinally extensive member is mounted within and in fixed relation to the tank, such that an immersion portion of the longitudinally extensive member extending upwardly from the second end is immersed in the liquid fuel in the tank, said longitudinally extensive member defining an internal volume from which liquid fuel in the tank is excluded, wherein said longitudinally extensive member further comprises:

first and second pressure sensors spaced apart by a fixed distance, and each having a face exposed to the local hydrostatic pressure of liquid fuel in the tank compartment, the respective first and second pressure sensors being configured to measure a pressure of the liquid fuel at a depth in the tank compartment determined by their location and relative to a pressure of said internal volume of the longitudinally extensive member;

a skirt portion secured in fixed relation to an upper part of said longitudinally extensive member, said skirt portion surrounding said upper part of said longitudinally extensive member to define a circumferential gap between an internal surface of the skirt portion and an external surface of the longitudinally extensive member, said circumferential gap being open to the headspace only at a local opening, and an aperture formed at an upper part of said longitudinally extensive member by which aperture the internal volume is in communication with said circumferential gap, the headspace and the internal volume communicating via said circumferential gap and said aperture formed at an upper part of said longitudinally extensive member such that the pressure of the internal volume is the same as the pressure of the headspace.

In the fourth, fifth and sixth aspects of the invention, "delivery of fuel" is typically delivery to a static storage tank or the like such as a storage tank for heating oil for commercial or domestic premises, or a storage tank at a service station for automotive fuels. "Delivery of fuel" could be the transfer of fuel to a tank compartment of a second delivery vehicle. "Delivery of fuel" is not delivery from the tank compartment of a fuel delivery (or any other) vehicle to an engine or motor for consumption in propulsion of the vehicle.

In some preferred embodiments of the sixth aspect of the invention said first end of said longitudinally extensive member can be attached to a wall of the fuel transporting tank.

In some preferred embodiments of the sixth aspect of the invention said local opening can be arranged distal from said an aperture formed at an upper part of said longitudinally extensive member, said internal volume and said headspace being in communication in use along a pathway extending through said aperture and within said circumferential gap to said local opening.

In some preferred embodiments of the sixth aspect of the invention said skirt portion can comprise opposed first and second end portions, said aperture formed at an upper part of said longitudinally extensive member being arranged proximate a first end of the skirt portion and said local opening being arranged at or proximate said second end.

In some preferred embodiments of the sixth aspect of the invention said skirt portion can be substantially cylindrical and said circumferential gap can be substantially annular.

In some preferred embodiments of the sixth aspect of the invention said local opening can be defined between a lowermost edge of the skirt portion and an adjacent part of the external surface of the longitudinally extensive member.

In some preferred embodiments of the sixth aspect of the invention the vehicle can further comprise at least one barrier ring arranged in said circumferential gap, the, or each, barrier ring being in contacting relation with the internal surface of the skirt portion and the external surface of the longitudinally extensive member and defining an aperture or gap by which portions of the circumferential gap on respective sides of the barrier ring communicate.

In some preferred embodiments of the sixth aspect of the invention the vehicle can comprise a plurality of barrier rings, the respective apertures or gaps of the barrier rings being rotationally offset.

In some preferred embodiments of the sixth aspect of the invention the vehicle can further comprise a mounting head assembly securable to an external part of said fuel transporting tank and by which the longitudinally extensive member can be mounted to the fuel transporting tank.

In some preferred embodiments of the sixth aspect of the invention said mounting head assembly can include a boss portion directed inwardly with respect to the transporting tank and wherein said longitudinally extensive member is mounted to said boss portion.

In some preferred embodiments of the sixth aspect of the invention said boss portion can include an aperture opening to said internal volume of the longitudinally extensive member and through which said internal volume communicates with the aperture formed at an upper part of said longitudinally extensive member.

In some preferred embodiments of the sixth aspect of the invention the vehicle can further comprise a data processing device configured to determine the identity of the fuel based on said pressure measurements from said first and second pressure sensors.

In some preferred embodiments of the sixth aspect of the invention can further comprise a colour sensing device comprising a light emitter and a light detector configured to detect light from the emitter, said emitter and detector being arranged such that in use light from the emitter incident on the detector passes through said fuel in the tank.

In some preferred embodiments of the sixth aspect of the invention said data processing device can be configured to determine the identity of the fuel based on said pressure measurements from said first and second pressure sensors and said colour sensing device.

BRIEF DESCRIPTION OF THE DRAWINGS

Embodiments of the disclosure are further described hereinafter with reference to the accompanying drawings, in which.

DETAILED DESCRIPTION

Figure 2:
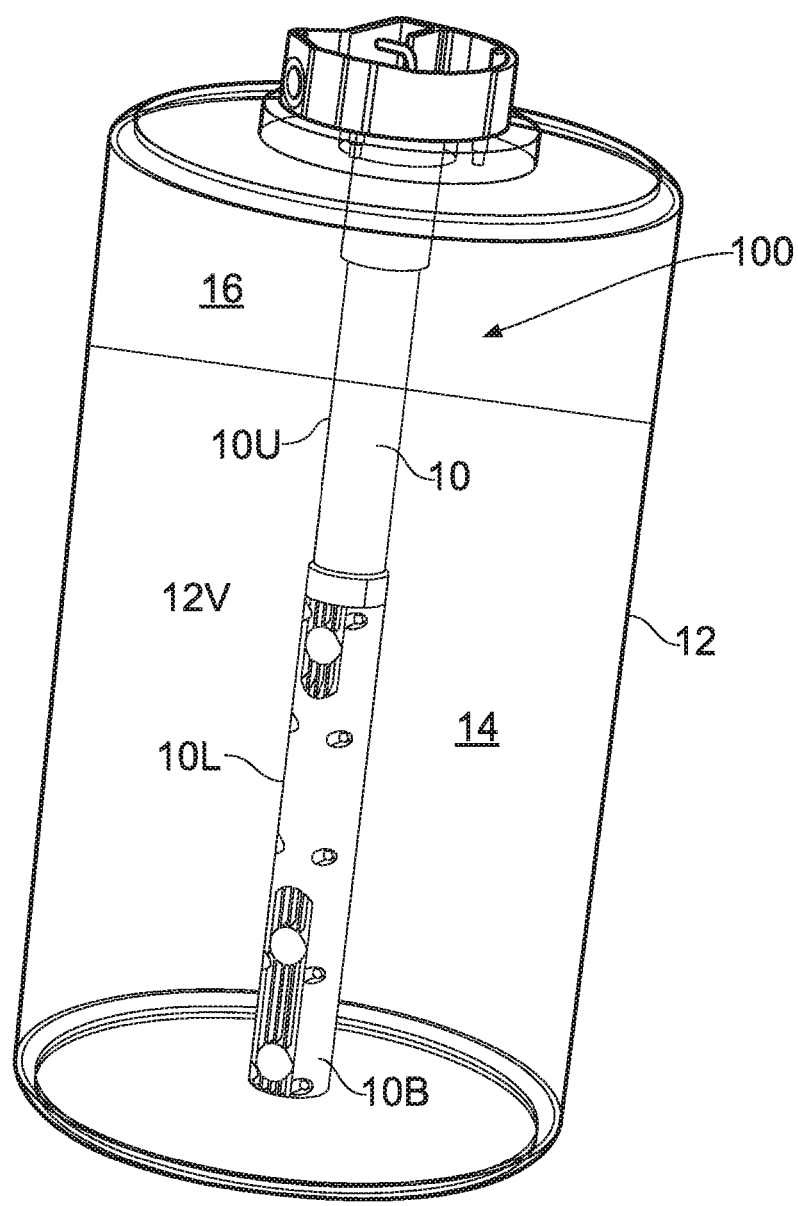
FIG. 2 is a general view showing an apparatus according to an embodiment of the invention mounted to a tank.

FIG. 2 shows schematically an apparatus 100 according to the disclosure mounted in a tank or tank compartment 12 of a fuel transport and delivery vehicle 200. Tank compartment 12 is shown schematically for the purpose of identifying relevant features thereof and does not therefore necessarily conform in terms of shape and configuration to a typical tank of a fuel transport vehicle 200.

Figure 1:
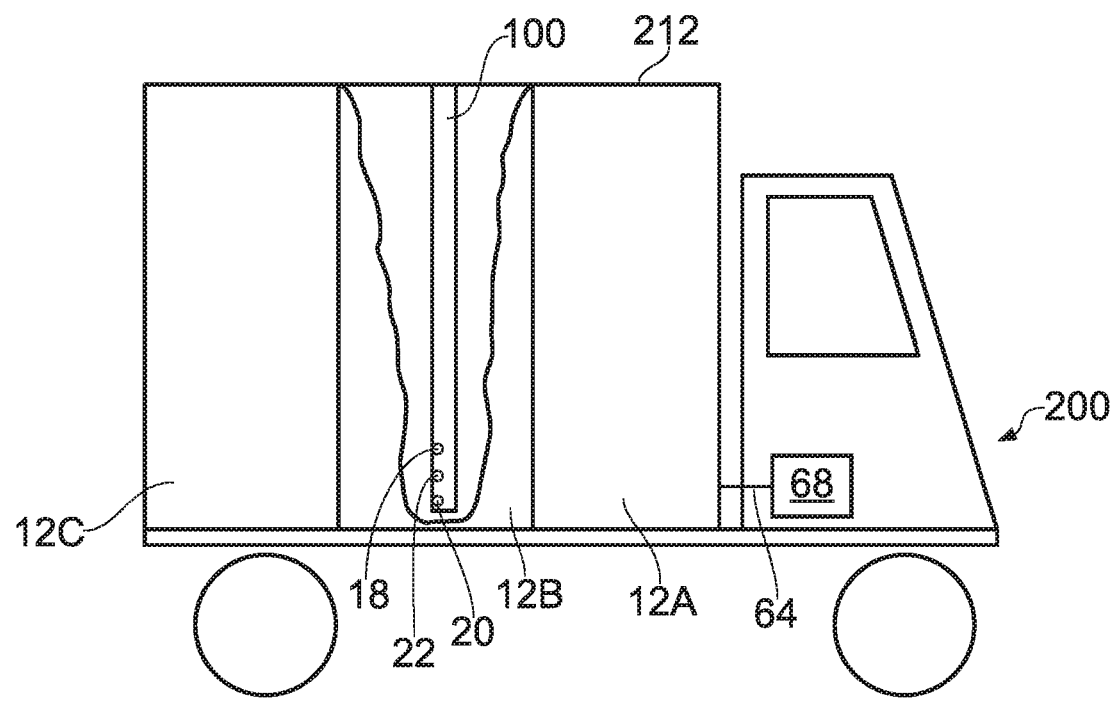
FIG. 1 is a schematic representation of a fuel delivery vehicle having a fuel tank compartment for conveying and delivering fuel and including an apparatus according to the present disclosure.

A vehicle 200 is shown schematically in FIG. 1, and is generally representative of a vehicle for road use. In FIG. 1, vehicle 200 can include a tank 212 for transporting fuels. In the illustrated embodiment tank 212 includes three discrete tank compartments 12, identified respectively as 12A, 12B and 12C, in which different fuels may be separately transported. Of course, vehicles may be provided with more or fewer tank compartments 12 depending on particular intended uses and other design requirements readily apparent to one of skill in the art. Also, although the vehicle is configured such that the respective tank compartments 12 can contain different fuels, the possibility that some or all of the tank compartments 12 can contain the same fuel is not precluded. In FIG. 1, a wall of tank compartment 12B is broken away for the purposes of illustration. An apparatus 100 of the present disclosure is mounted within tank compartment 12B. Corresponding apparatus 100 can be mounted in tank compartments 12A and 12C.

The apparatus 100 according to the present disclosure can comprise a longitudinally extensive member 10 which can typically be mounted at a first end 10A to a top portion 12T of tank compartment 12. In some preferred arrangements, longitudinally extensive member 10 can be unitary. In other preferred arrangements, longitudinally extensive member can be formed from two or more conjoined sections such as sections 10U and 10L shown in FIG. 3. Respective sections 10U and 10L can conveniently be joined at a threaded joint 140.

In some preferred arrangements, longitudinally extensive member 10 can be arranged substantially vertically within the tank compartment 12. Also in some preferred arrangements, a lower second end 10B can be arranged proximate the lowest portion of the tank compartment 12. In some preferred arrangements, tank compartment 12 can be of curved form such as an at least approximately cylindrical form or broadly oval form in cross section and longitudinally extensive member 10 can extend to a lowermost region of the tank compartment 12 defined by such curved form. Longitudinally extensive member 10 can be arranged generally centrally within the tank compartment 12, with respect to any width dimension of the tank compartment 12, such as along or close to a nominally vertical bisector of the tank compartment 12.

Tank compartment 12 can define a volume 12V which at least during transportation of the fuel is a closed volume. By way of example, volume 12V can be open when fuel is being loaded into the tank or discharged from the tank compartment 12, or when the tank compartment 12 is empty, (such as for maintenance). Typically one or more venting devices can be provided to regulate the pressure within the tank compartment 12. Two types of venting device can be provided, that is, a first device which can vent vapour from the tank compartment 12 if the pressure within the tank compartment 12 exceeds a threshold pressure and a second device which can permit the ingress of air from outside the tank compartment 12 if the pressure in the tank compartment falls below a threshold value.

The closed volume 12V of the tank compartment 12 can contain in use a body of liquid fuel 14 and a headspace 16. The headspace 16 is that portion of the interior of the tank compartment 12 which is above the level of the body of liquid fuel 14. The headspace 16 can therefore primarily contain air and fuel vapour. The relative volumes of the body of liquid fuel 14 and headspace 16 will depend on the extent of filling of the tank compartment 12 at any given time. The headspace 16 is not in communication with the atmosphere external to the tank compartment 12 other than when the tank is opened (for the purposes indicated above) or, transiently, by the actions of the venting devices.

The longitudinally extensive member 10 can be a tube or tube like structure which defines an internal volume 26. The internal volume 26 can extend for substantially the whole length of the longitudinally extensive member from the first end towards the second end. The longitudinally extensive member 10 is constructed such that the internal volume 26 is never in direct liquid communication with the body of fuel 14. In particular, constructions according to embodiments of the invention can provide that there is substantially no, or preferably virtually no, or ideally absolutely no liquid flow path for the liquid fuel 14 from the tank compartment 12 to the internal volume 26 of the longitudinally extensive member 10. Internal volume 26 can communicate with headspace 16, as will be discussed further below.

In the context of the present application "communicate" and grammatical variations thereof refers primarily to the freedom for a gas (such as air) or vapour (such as fuel vapour) to move between a first specified space, volume or region and a second specified space, volume or region along a communication path. Such first and second spaces, volumes or regions can, by way of example, be an internal volume of the longitudinally extensive member and a headspace of a tank compartment. Such movement can be as a result of one or more of diffusion, convection and pressure differentials between the respective specified spaces which may from time to time occur. The communication path refers to the communication route along which such movement of gas or vapour can occur and the word "path" does not of itself imply or require any concrete or fixed structure beyond or in addition to such structures as are identified in connection with embodiments described herein.

References herein to "liquid communication" and similar terms refer analogously to the freedom of a liquid to move between a first specified space, volume or region and a second specified space, volume or region along a liquid communication path. A liquid communication path can in principle be the same as a gas or vapour communication path. A gas or vapour communication path can in embodiments of the invention be constructed or configured to prevent or deter the passage of liquid along the path, that is, a gas or vapour can communication path can, in some embodiments, be other than a liquid communication path.

In some preferred constructions, the longitudinally extensive member 10 can be defined by a side wall 28 and a lower end wall 30, the respective walls 28, 30 defining the internal volume 26. The longitudinally extensive member 10 can be at least approximately cylindrical, in which case the side wall 28 can be generally cylindrical.

External surfaces of the longitudinally extensive member 10 which are within the tank compartment 12 (in the illustrated embodiment, end wall 30 and side wall 28) may be in contact with the liquid fuel contained within the tank compartment 12. Those parts of the longitudinally extensive member 10 which are in contact with the body of liquid fuel in the tank compartment 12 constitute the immersion portion of the longitudinally extensive member 10. The extent of the immersion portion therefore depends on the extent of filling of the tank compartment 12 (that is, on the amount of liquid fuel from time to time contained in the tank compartment 12). However, apparatus 100 can most preferably be configured such that liquid contact of internal volume 26 with the liquid fuel 14 in the tank compartment 12 is prevented, and liquid fuel communication between internal volume 26 and tank compartment 12 is negligible, and may be entirely prevented.

Longitudinally extensive member 10 can in use conveniently be inserted into a tank compartment 12 though an aperture 12P formed in an upper part, such as top part 12T, of tank compartment 12. An upper portion 10T of first end 10A of longitudinally extensive member 10 can, in the position of use of the longitudinally extensive member 10, conveniently be arranged in or proximate said aperture 12P. For example said upper portion 10T can be positioned within aperture 12P so that an upper margin thereof does not extend beyond an upper limit of the aperture 12P. In an alternative arrangement said upper portion 10T can be positioned immediately below said aperture 12P.

Longitudinally extensive member 10 can fastened to an upper part, such as top part 12T, of tank compartment 12. Such fastening can be indirect, such as via an intervening component.

In some less preferred constructions, some external parts of upper portion 10T can be arranged outside the tank compartment and external surfaces thereof can be exposed to the atmosphere, provided always that the internal volume 26 of the longitudinally extensive member 10 does not communicate with the atmosphere and that the communication of the internal volume 26 with the headspace 16 of the tank compartment 12, as discussed in more detail below, is not compromised.

An external head assembly 32 can be secured in use to tank compartment 12, in particular to an external top part 12T of tank compartment 12. In one preferred arrangement, head assembly 32 can include a radially outwardly directed flange 32F. Flange 32F can form a closure for aperture 12P. Head assembly 32 can include a downwardly directed boss portion 32D which can enter aperture 12P and to which the longitudinally extensive member 10 can be attached at its first end 10A. Head assembly 32 can thus form an "intervening component" as noted above. In one convenient embodiment, boss portion 32D can be in the form of a downwardly directed skirt depending from an underside of the flange 32F. Said skirt can usefully be of generally cylindrical form.

Figure 4:
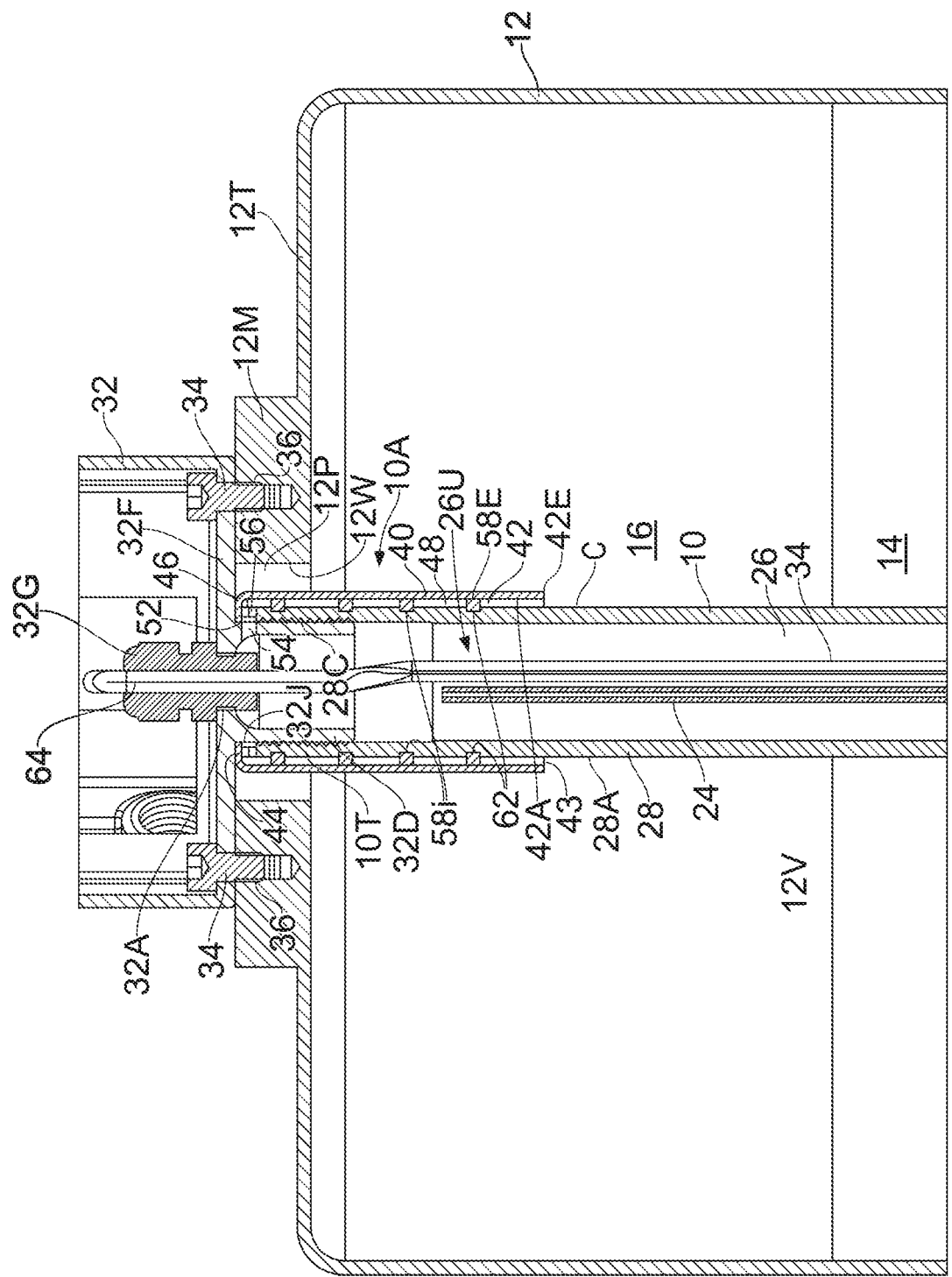
FIG. 4 is an enlarged view of an upper part of FIG. 3.
Figure 5:
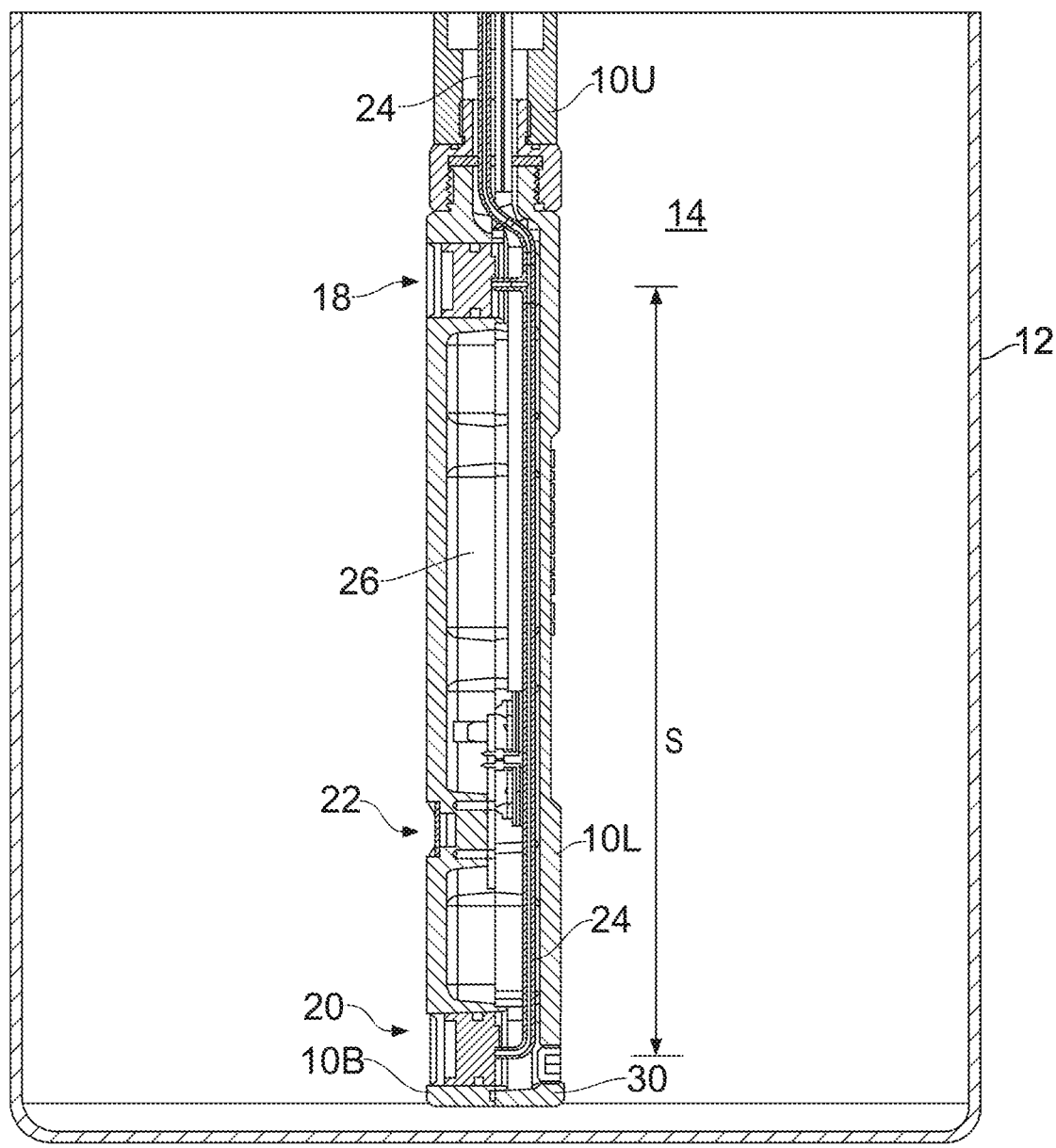
FIG. 5 is an enlarged view of a lower part of FIG. 3.
Figure 6:
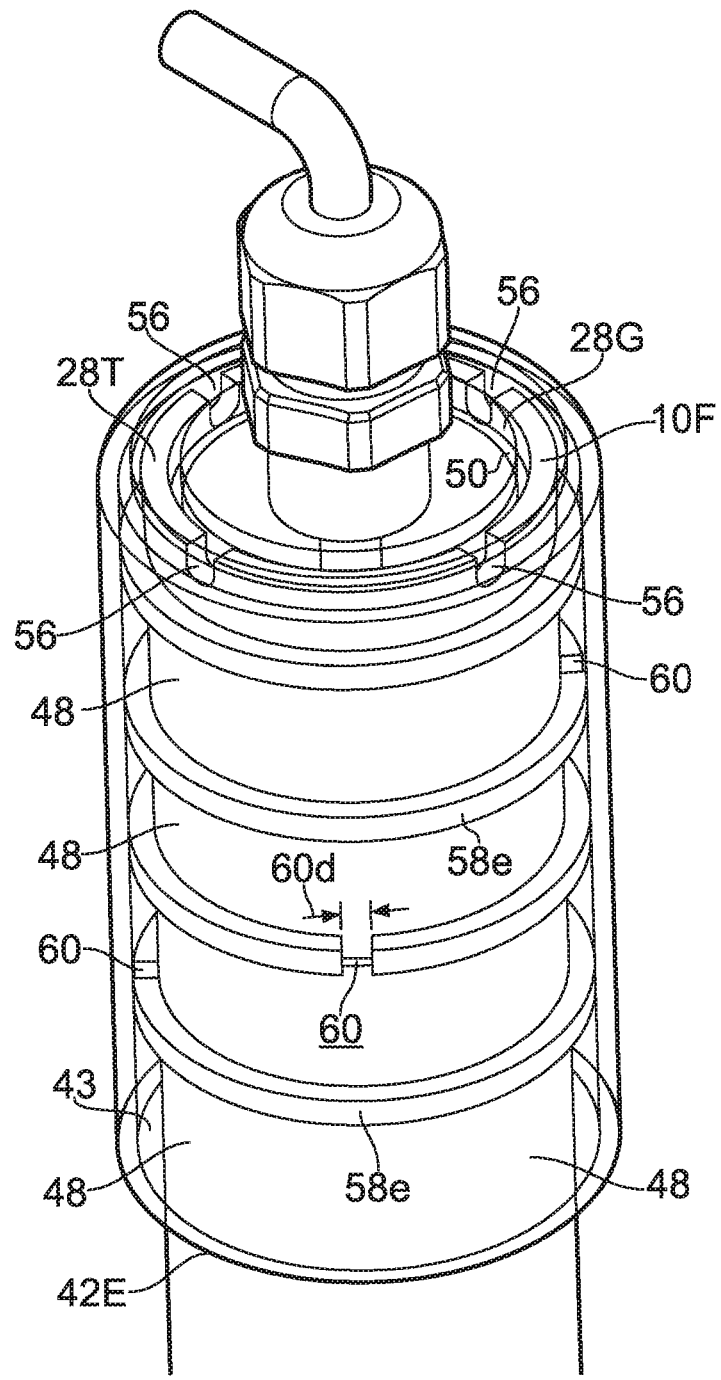
FIG. 6 shows an upper part of an apparatus according to an embodiment of the invention, with some components removed for clarity.

In one preferred construction, first end 10A (in particular embodiments, upper portion 10T thereof) may include a screw thread which cooperates with a complementary screw thread of the downwardly directed boss portion 32D of the head assembly 32 for attachment of the first end 10A to the boss portion 32D. For example the screw thread of first end 10A can be an internal screw thread and screw thread of boss portion 32D can be an external screw thread, as illustrated in FIG. 4.

In one convenient construction, top part 12T of tank compartment 12 can include a relatively thickened annulus or boss 12M. Boss 12M can have an internal wall 12W which can typically be of cylindrical form, and which wall 12W defines the perimeter of aperture 12P. Flange 32 can be secured to top part 12T by bolts 34 which engage complementary blind bores 36 of the top part 12T. Blind bores 36 can conveniently be provided in boss 12M of top part 12T Flange 32F can define an aperture 32A which can conveniently be arranged centrally with respect to upper end 10A of the longitudinally extensive member 10, such as in line with the longitudinal axis of the longitudinally extensive member 10. Aperture 32A can accommodate a gland or other sealing arrangement 32G which closes the internal volume 26 with respect to the atmosphere.

Flange 32F can form a closure (in combination with gland 32G) for aperture 12P by which communication between the headspace 16 and the atmosphere through aperture 12P is prevented.

Gland 32G can include a passage, typically arranged centrally, which sealingly accommodates a conduit 34 which can extend from internal volume 26 to the exterior of the apparatus 100. Conduit 34 can accommodate wires or the like for the transmission of electrical power and/or data, such wires being separated from the internal volume 26 and from any liquid fuel 14 at least by the conduit 34.

As noted above, lower end 10B of longitudinally extensive member 10 can be arranged in the closed volume 12V of tank compartment 12 such that the lowermost part thereof is disposed near to the lowermost part of the tank compartment 12.

A first pressure sensor 18 and a second pressure sensor 20 can be mounted to a lower end portion 10B of the longitudinally extensive member 10. Second pressure sensor 20 can be mounted adjacent lower end wall 30 of the longitudinally extensive member 10. Pressure sensors are mounted to the longitudinally extensive member 10 at a fixed longitudinal spacing s so that when the longitudinally extensive member 10 is mounted in use in tank compartment 12 the vertical spacing between the pressure sensors 18, 20 is known. Of course, when the longitudinally extensive member 10 is arranged vertically (as is preferred in some embodiments) the vertical spacing of the sensors 18, 20 is equal to the distance s.

Each pressure sensor 18, 20 can include a first side or face which is exposed to the hydrostatic pressure of the body of fuel 14 in the tank compartment 12 and a second side which can be contained within the internal volume 26 of the longitudinally extensive member 10. Second sides of the respective pressure sensors 18, 20 are not, therefore exposed to the hydrostatic pressure of the body of fuel 14 in the tank compartment 12 but are exposed to the pressure prevailing in the internal volume 26. The respective pressure sensors 18, 20 can be mounted in, and can penetrate through, the wall 28 of the longitudinally extensive member. In order to maintain the separation of the internal volume 26 of the longitudinally extensive member 10 from the liquid fuel 14 contained in the tank compartment, suitable sealing arrangements can be provided for pressure sensors 18, 20. For example, the first faces of pressure sensors 18, 20 can be indirectly exposed to the fuel 14, such as via a sealing film or diaphragm, which nevertheless allows transmission of the local hydrostatic pressure of the fuel 14 to the pressure sensors 18, 20. In another example, the pressure sensor 18, 20 can itself be configured to provide an impenetrable barrier to the passage of fuel 14 from the tank compartment 12 to the internal volume 26. Pressure sensors 18, 20 can each be mounted in a sensor housing and the sensor housing can be arranged in an aperture of the wall 28 of the longitudinally extensive member 10. In a further preferred example, the sensors 18, 20 (or their respective housings) can be set in a suitable potting compound which locally fills the internal volume 26 in a region surrounding the respective sensors 18, 20. Suitable potting compounds can include resinous materials which can be added to the internal volume 26 around the sensors 18, 20 as a liquid and which subsequently set to a solid.

The second sides of the respective pressure sensors 18, 20 can each be exposed to a common reference pressure (which need not be a constant (i.e. invariant) reference pressure). That is, both sensors 18, 20 can be exposed to the same reference pressure at the same time.

In some preferred embodiments, the second sides of the respective pressure sensors can be exposed only to the pressure in the headspace (vapour space) 16 of tank compartment 12. Conveniently, in some preferred embodiments the second sides of the first and second pressure sensors 18, 20 can be exposed to the pressure of the internal volume 26 of the longitudinally extensive member 10 and the internal volume 26 can communicate with the headspace 16 (as discussed further below). The internal volume 26 of the longitudinally extensive member 10 can therefore always be at the same pressure as the headspace 16.

In some preferred embodiments, a conduit 24 is provided which can extend generally longitudinally within the longitudinally extensive member 10, preferably within the internal volume 26. The conduit 24 can communicate at a first end with an upper part 26U of internal volume 26 which, conveniently, can be near to upper end 10T of longitudinally extensive member 10. Conduit 24 can, other than at said first end, be closed to internal volume 26. At a second end region conduit 24 can communicate with the respective second sides of the first and second pressure sensors 18, 20. Thus the respective second sides of the first and second pressure sensors 18, 20 can open only into a common conduit 24 which leads to, and opens to, internal volume 26 which in turn communicates with the headspace 16. The pressure in the headspace 16 thus provides the common reference pressure for the respective pressure sensors 18, 20. Conduit 24 can be a pipe or tube having solid walls without openings or apertures, except at the first end thereof for communication with internal volume 26 and at the second end for exclusive communication with the first and second pressure sensors 18, 20.

In some embodiments, conduit 24 can be absent and the respective second sides of the first and second pressure sensors 18, 20 can communicate directly with the internal volume 26. However, embodiments including the conduit 24 can be advantageous in at least two respects. Firstly, where the sensors 18, 20 are encased in a potting compound, the conduit 24 provides a passage through the potting compound so that communication of the sensors 18, 20 with the internal volume 26 can conveniently be maintained. Secondly, since the internal volume 26 is in communication with the headspace 16 it is possible that some minor amounts of fuel vapour from the headspace could condense within the internal volume 26. Conduit 24 can at least substantially prevent any such condensed fuel within the internal volume 26 from contacting the respective second sides of the pressure sensors 18, 20, since the conduit 24 opens only at an upper part 26U of the internal volume. Enclosure of the pressure sensors 18, 20 within a potting compound is also effective in preventing contact between any part of the pressure sensors 18, 20 and any such condensed fuel within the internal volume 26.

Lower end 10B of longitudinally extensive member 10 can also include a colour sensing arrangement or device 22. The colour sensing device 22 can be mounted in, and can penetrate through, the wall 28 of the longitudinally extensive member 10. In order to maintain the separation of the internal volume 26 of the longitudinally extensive member 10 from the liquid fuel 14 contained in the tank compartment 12, suitable sealing arrangements can be provided for colour sensing device 22. For example, the first face of colour sensing device 22 can be indirectly exposed to the fuel 14, such as via a sealing film of suitable optical transparency. In another example, the colour sensing device 22 can itself be configured to provide an impenetrable barrier to the passage of fuel 14 from the tank compartment 12 to the internal volume 26. In a further preferred example, the colour sensing device 22 can be set in a suitable potting compound which locally fills the internal volume 26 in a region around the colour sensing device 22. Suitable potting compounds can include resinous materials which can be added to the internal volume 26 around the colour sensing device 22 as a liquid and which subsequently sets to a solid.

The respective first and pressure sensors 18, 20 and the colour sensing device 22 can each provide an electrical data output to data transmission means such as one or more wires or cables indicated at 64. Wires 64 and their associated electrical connections with the pressure sensors 18, 20 and colour sensing device 22 can be contained within the conduit 34 which passes out of apparatus 100 via gland 32G. Wires 64 are therefore maintained entirely separate from the fuel 14, and from any fuel vapour which may be present in internal volume 26. In this respect, the presence locally around the pressure sensors 18, 20 and colour sensing device 22 of the potting compound is also effective in ensuring separation of any electrical component of, or associated with, the colour sensing device 22 or pressure sensors 18, 20 from fuel 14, fuel vapour or condensed fuel vapour.

Wires or cables 64 can also be provided in order to supply electrical power from a suitable power supply to the pressure sensors 18, 20 and the colour sensing device 22.

Wires 64, together with corresponding wires 64 from other tank compartments 12 can connect to a data processing device 68 which can be arranged at a convenient location on the vehicle 200, externally of tank compartments 12. Thus data processing device 68 can receive output data from the respective first and second pressure sensors 18, 20 and from the colour sensing device 22 and can make calculations on the basis of that data. The data processing device can be configured to control operational aspects of the vehicle 200, such as aspects connected to the dispensing of fuel 14 and/or to provide informative output to the vehicle operator, for example in relation to the identity and/or quantity of the fuel 14 contained in a given tank compartment 12. In one example, data processing device 68 can be configured to prevent dispensing of fuel from a tank compartment 12 until a positive input, such as from an operator, is received which input confirms that the vessel into which the fuel is to be dispensed from the tank 12 (such as an underground tank of a filling station) is compatible with the particular fuel determined by the data processing device 68 to be in the tank compartment 12.

A temperature sensor or probe 66 can be provided to measure the temperature of the body of fuel 14 at any given time and to provide a corresponding output to the data processing device 68 via wires 64.

Colour sensing devices are, as such, known. In general terms any colour sensing arrangement which can distinguish between different fuel colours and which can be securely mounted in optical communication with the body of fuel 14 can be included in the apparatus of the present disclosure. It is, of course, essential that the colour sensing device 22 does not prejudice safety, and in particular the colour sensing device 22 must not provide any possible source of ignition of the body of fuel 14. It can therefore be desirable in some embodiments for operational elements of the colour sensing device 22 to be sealed or encased behind an optically transparent window, so that such operation elements never come into contact with the body of fuel 14.

In one preferred embodiment the colour sensing device 22 can comprise an emitter including one or more LEDs operable to emit red, green and blue light. The emitted light passes through a portion of the fuel 14 and is received by a detector. The path of light from the emitter to the detector can be indirect, in the sense that the light may be reflected by a suitable reflective surface, such as a portion of the longitudinally extensive member 10. Including a reflector in the light path can be advantageous in increasing the path length of the light through the fuel 14. Light emission of the different colours may be sequential or simultaneous depending, for example, on the choice of detector. The detector may, for example, determine RGB values for the detected light whereby one or more parameters associated with the colour of the fuel can be determined. An appropriate output sent to the data processing device 68 by the detector can allow the data processing device to determine the measured colour parameters.

Figure 7:
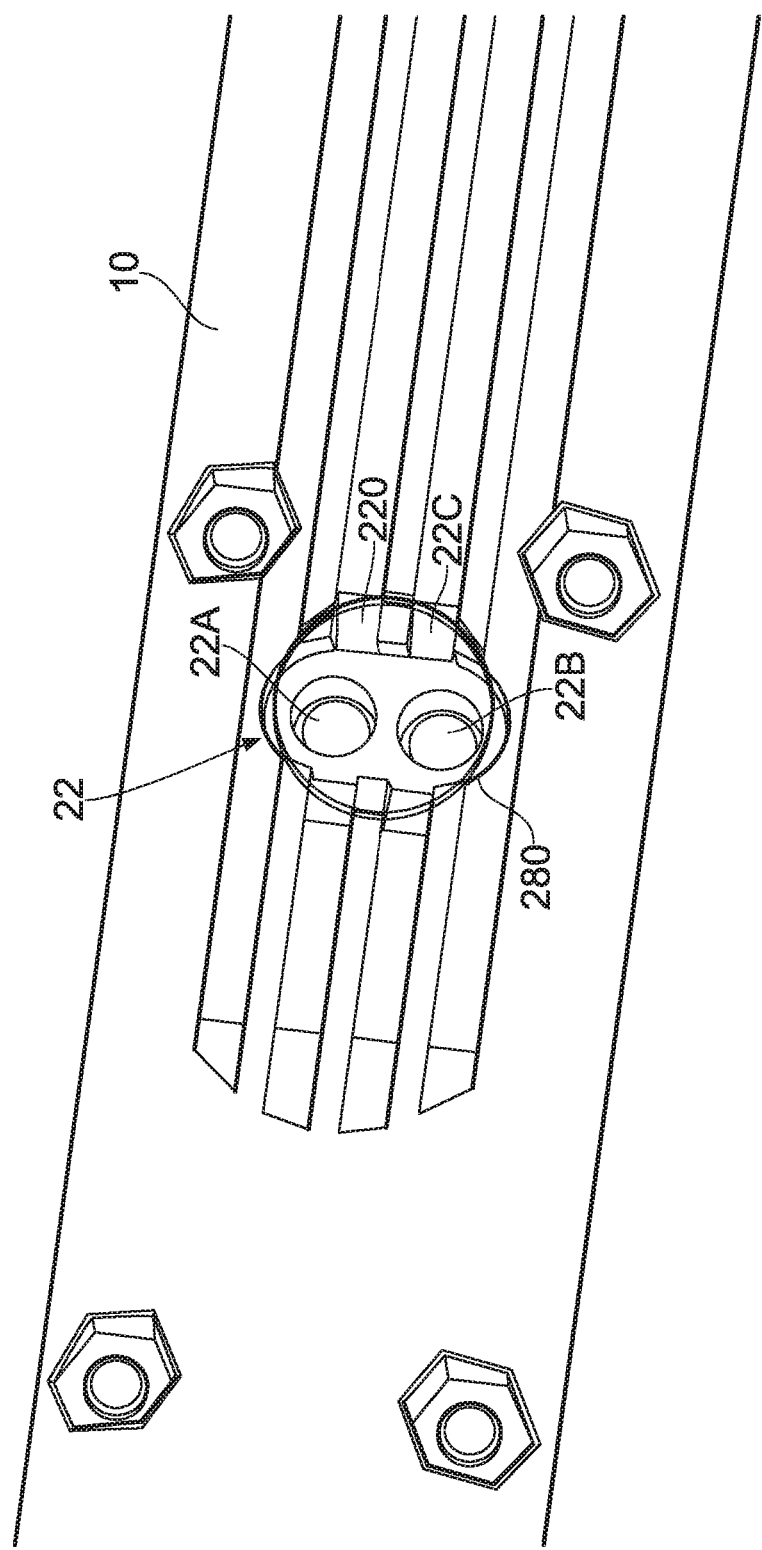
FIG. 7 shows a side view of a portion of an apparatus according to an embodiment of the present disclosure.
Figure 8:
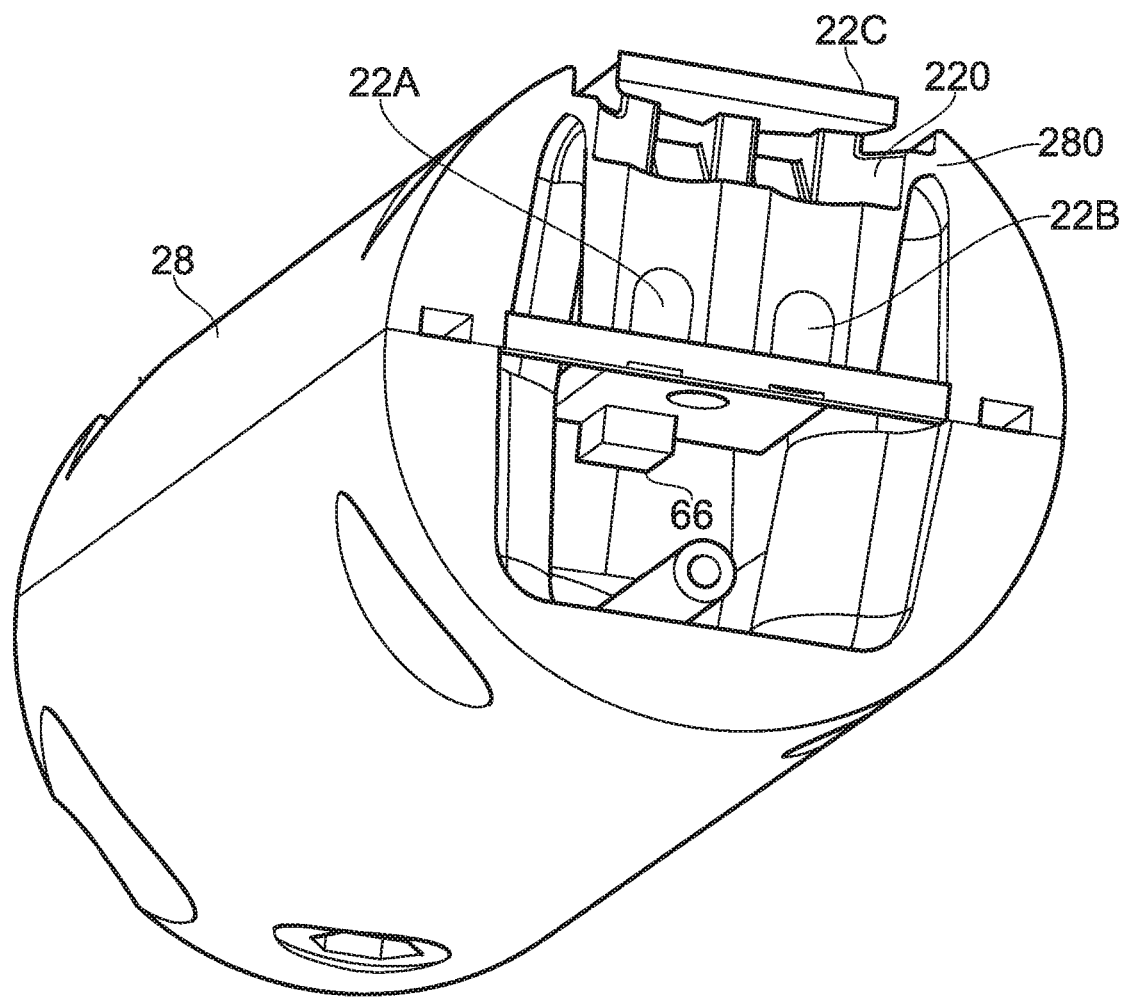
FIG. 8 shows a section through a portion of an apparatus according to an embodiment of the present disclosure.

In one embodiment as illustrated in FIGS. 7 and 8, colour sensing device 22 is mounted at an inner part of a well 220 formed in a local portion 280 of wall 28 of the longitudinally extensive member. Well 220 can be in the form of a recess extending inwardly with respect to outer surface of wall 28 of the longitudinally extensive member. A cover plate 22C can be provided at an outermost part of the well 220. Cover plate 22C can conveniently be configured to be approximately flush with external surface of wall 28. Cover plate 22C can have an internal face which is directed towards internal part of well 220. Well 220 can be open to the body of liquid fuel 14 so that the liquid fuel can enter the well 220. As noted, colour sensing device 22 can comprise are least one light emitter and at least one light detector.

In one configuration, device portion 22A can be an emitter and an adjacent device portion 22B can be a detector, the respective emitter 22A and detector 22B being contained in a housing of suitable optical transparency, or mounted behind a wall or partition of suitable optical transparency so that there can be no contact between the emitter 22A, detector 22B and liquid fuel 14. In this configuration, light from emitter 22A can be reflected by internal face of cover plate 22C to be received by the detector 22B. Thus light from emitter 22A can pass along a light path through the liquid fuel 14 present in well 220 from emitter 22A to detector 22B via reflection at cover plate 22C.

In another configuration, each of 22A and 22B can represent a housing or compartment containing both an emitter and a detector. In this configuration, an emitter contained in housing 22A can emit a beam of light which is directed at, and reflected by, cover plate 22C and received by a detector also in housing 22A. Similarly an emitter contained in housing 22B can emit a beam of light which is directed at, and reflected by, cover plate 22C and received by a detector also in housing 22B. In each case the light beam passes through the liquid fuel 14 present in the well 220.

As noted above, first and second pressure sensors 18, 20 determine the pressure of the fuel relative to a common reference pressure which in some preferred embodiments is the pressure in the headspace 16. The respective second sides of the pressure sensors 18, 20 can communicate exclusively with the headspace 16, via the internal volume 26, to establish the common reference pressure. Exclusive communication is provided by ensuring that the respective second sides of the pressure sensors 18, 20 can communicate only with the internal volume 26 and the internal volume 26 communicates only with the headspace 16. Thus internal volume 26 is closed with respect to the atmosphere and can be seen as effectively closed with respect to the liquid fuel body 14.

As noted above, apparatus 100 must be carefully constructed to ensure that substantially no fuel 14 in liquid form can enter the internal volume 26, while maintaining gas (and vapour) communication between the internal volume 26 and the headspace 16 so that both are at the same pressure. In a simple hypothetical construction, as might be envisaged on an initial consideration, the internal volume 26 could open directly into the headspace 16 via an aperture in wall 28 of the longitudinally extensive member, such as at point C. However, such a construction would be unsatisfactory since it could not prevent—to the extent necessary or desirable—entry of liquid fuel into the internal volume 26, considering, for example, the movement of the liquid fuel 14 in the tank compartment 12 during transport, caused by movement of the vehicle over rough surfaces, around bends or when accelerating or decelerating. Hence an alternative solution is required. The applicant has considered routing a closed conduit from internal volume 26 out of the longitudinally extensive member 10 via a bore in the head assembly 32 to the exterior of the tank compartment 12 and then through a wall of the tank compartment 12 into the headspace 16. Such a routing of a closed conduit could provide satisfactory gas and vapour communication between the pressure sensors 18, 20 and the headspace 16 while avoiding liquid communication, but is disadvantageous in that the portion of the such a conduit which lies outside the tank compartment 12 would be vulnerable to damage, such as by items (such as branches of trees) striking the vehicle during transit, or to accidental damage by on operator working on top of the tank compartments 12. Also, such a routing of the closed conduit can make it more difficult or complicated to remove the longitudinally extensive member 10 for repair or maintenance, since the closed conduit must then first be separated from the longitudinally extensive member 10.

Hence, the applicant has sought to provide an alternative arrangement which can obviate or mitigate these disadvantages.

In some preferred embodiments of the invention internal volume 26 of the longitudinally extensive member 10 can communicate with the headspace 16 via a path which is indirect or tortuous and which can be of restricted dimension, at least at one point and preferably at more than one point. The path could conveniently be described as labyrinthine to reflect its indirect nature. The path can be wholly defined within the tank compartment 12 when the longitudinally extensive member 10 is in its position of use.

In some preferred constructions according to the above embodiments the upper end 10A of the longitudinally extensive member 10 can be provided with or located within a skirt portion 42. Thus, uppermost end of longitudinally extensive member 10 can be received into the skirt portion 42. Skirt portion 42 can conveniently be generally cylindrical. Skirt portion 42 can be defined as a part of a cup member 40 which can include the skirt portion 42 and a top portion 44. Skirt portion 42 can be joined to the top portion by a shoulder 46. Top portion 44, skirt portion 42 and shoulder 46 can be formed integrally. Top portion 44 can conveniently be in the form of a nominally horizontal flange which defines an aperture sized for passage therethrough of the downwardly directed boss portion 32D of a head assembly 32. When, in its position of use, top portion 44 is arranged nominally horizontally, the skirt portion 42 extends nominally vertically downwards. When the longitudinally extensive member 10 is secured in its position of use within the tank compartment 12, uppermost end of the longitudinally extensive member is received within the skirt portion 42.

In some preferred arrangements, top portion 44 is arranged between an underside of the flange 32F of the head assembly 32 and an uppermost face 10F of the longitudinally extensive member 10, in contacting relation with both, and is thereby held in its position of use.

Skirt portion 42 can be sized relative to the longitudinally extensive member 10 to define a circumferential gap 48 between the external surface of wall 28 of longitudinally extensive member 10 and internal surface 42A of skirt portion 42. In some preferred configurations the internal surface 42A can have a configuration which conforms to the external surface of wall 28, so that the circumferential gap 48 is of regular form. That is, the size of the circumferential gap 48 can be substantially invariant around the circumference of wall 28. Where, in accordance with some preferred embodiments, the respective skirt portion 42 and longitudinally extensive member 10 are substantially cylindrical, gap 48 is substantially annular. The width of the circumferential gap 48 (in the case of an annular gap 48, its radial dimension) is preferably at least about 0.5 mm and not more than about 5 mm, such as between about 1 mm and about 3 mm and in particular about 1.5 mm. The circumferential gap 48 can open to the headspace only at a local opening 43. In the illustrated embodiment, local opening 43 is defined between lower marginal edge 42E of the skirt portion 42 and the adjacent external surface of wall 28 of the longitudinally extensive member 10. Local opening 43 is shown in the illustrated embodiment as extending around the whole circumference of the longitudinally extensive member 10 at the marginal edge 42E of the skirt portion 42. In other embodiments, the local opening 43 can occupy only a portion, in particular a small portion of said circumference. For example, most of the gap between the marginal edge 42E of the skirt portion and the adjacent external surface of wall 28 can be closed by one of the barrier rings 58 discussed below. In all these embodiments local opening (43) can define only a small, restricted, opening, relative to the size of the longitudinally extensive member 10, which provides the only route by which air or fuel vapour from the headspace can enter the circumferential gap 48.

Figure 3:
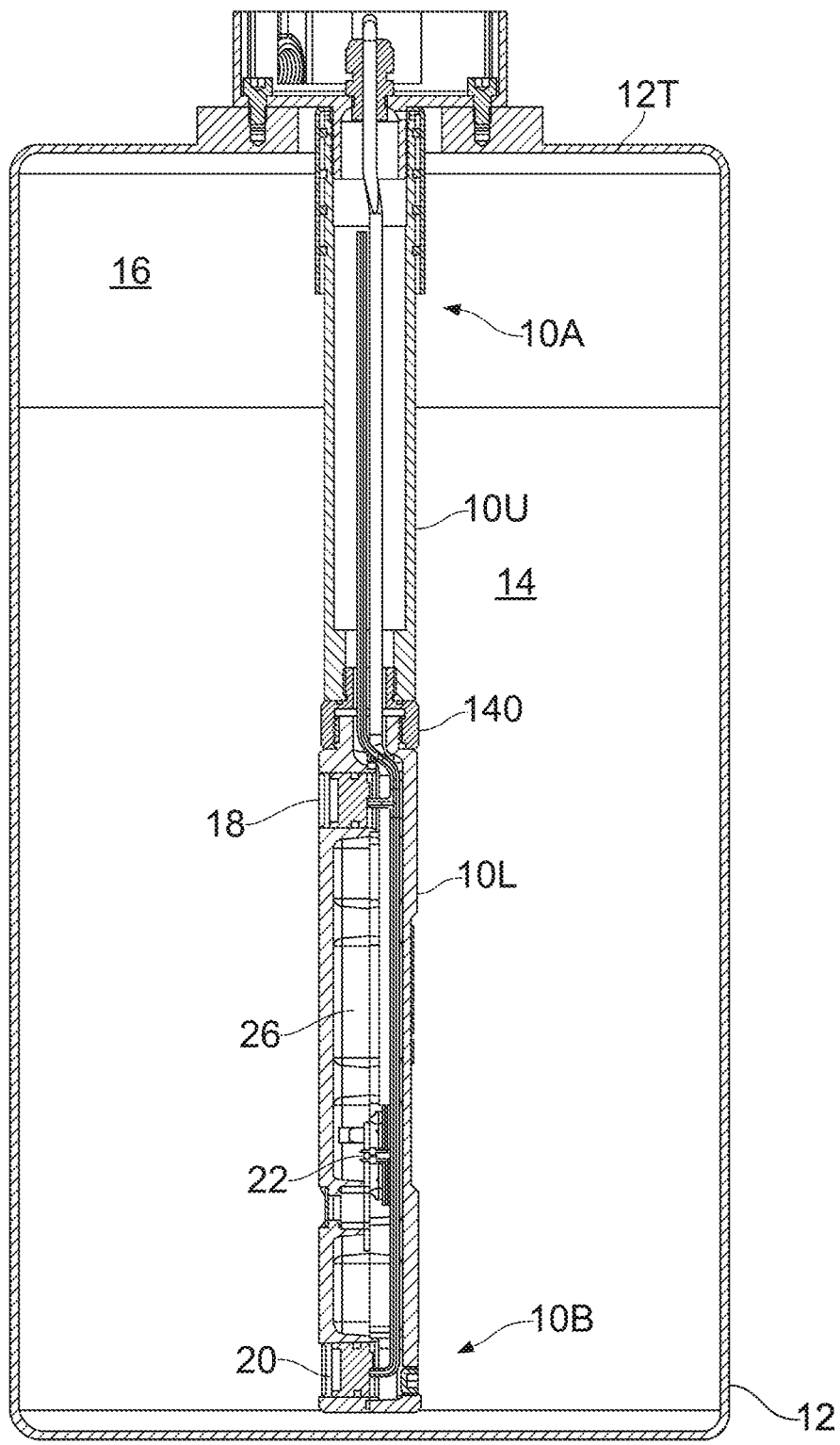
FIG. 3 is a general view showing an apparatus according to an embodiment of the invention mounted to a tank, the apparatus being shown in cross-section.

An uppermost portion of wall 28 can include a portion 28T which is thinner than the wall immediately below the portion 28T (with respect to the orientation of the longitudinally extensive member 10 in FIGS. 3 and 4), so that a step or shoulder 50 is formed at the internal side of wall 28. In some preferred arrangements, a portion 28C of internal surface 28B of wall 28 below step 50 is arranged in confronting relation with the external surface of boss portion 32D. In the preferred construction as illustrated in the Figures, said portion 28C can be the screw threaded portion which cooperates with a complementary screw threaded portion of the downwardly directed boss portion 32D of a head assembly 32, as noted above, this arrangement being convenient for securing the upper portion 10T of the longitudinally extensive member 10 to the boss portion 32D.

A circumferential space 52 can thus be defined between an internal wall surface 28G of wall 28 extending upwardly from said step 50 and a juxtaposed wall portion 32J of the boss portion 32D. Where the boss portion 32D and the wall 28 are substantially cylindrical, said circumferential space can be a substantially annular space. In some preferred arrangements circumferential space 52 can have a width (in the case of an annular space 52, its radial dimension) which is of similar order of magnitude to circumferential gap 48. For example, space 52 can have a width of from about 0.5 mm to about 3 mm, such as about 1.5 mm.

Boss portion 32D can include at least one port or aperture 54 which is advantageously arranged at an upper portion thereof. Port 54 can provide communication between the internal volume 26 of the longitudinally extensive member 10 and the circumferential space 52. In this way, the circumferential space 52 and the internal volume 26 can always be at the same pressure.

Thinner portion 28T of wall 28 can include at least one aperture or port 56. In some preferred arrangements a plurality of ports 56 can be provided, such as two, three, four, five or six ports. In some preferred constructions four ports 56 can be provided. Where a plurality of ports 56 is provided, the ports 56 can be equidistantly spaced around the thinner portion 28T of wall 28. The respective ports 54, 56 can conveniently have a maximum dimension of from about 0.5 mm to not more than about 5 mm, such as between about 1 mm and about 3 mm and in particular about 1.5 mm. Port or ports 56 can provide communication between the circumferential space 52 and circumferential gap 48 (recalling that circumferential gap 48 is arranged between the external surface of wall 28 of longitudinally extensive member 10 and internal surface 42A of skirt portion 42). In this way, the circumferential space 52 and the circumferential gap 48 can always be at the same pressure. Since the circumferential space 52 and the internal volume 26 can always be at the same pressure (being in communication) and similarly since the circumferential gap 48 and the headspace 16 can always be at the same pressure (being in communication) it follows that the headspace 16 and the internal volume 26 can always be at the same pressure.

Expressed differently, in some preferred embodiments of the invention a path exists from the headspace 16 via the circumferential gap 48, aperture 56, circumferential space 52 and aperture 54 to the internal volume 26 of the longitudinally extensive member 10. Air and fuel vapour can pass along the said path in either to direction to equalise any differences in pressure between the headspace 16 and the internal volume 26 which may from time to time occur, so that the headspace 16 and the internal volume 26 can always be at the same pressure.

An advantage of the arrangement according to preferred embodiments of the invention for ensuring that the internal volume 26 and the headspace 16 can always be at the same pressure is that the path from the headspace 16 to the internal volume 26 (and vice versa) is indirect and restricted in size. These features provide a deterrent to the passage of liquid fuel from the body of fuel 14 to the internal volume 26. The indirect nature of the path can be seen in that the path extends from a lowermost edge of the skirt portion 42 via the circumferential gap 48, to aperture 56 located near an uppermost part of cup member 40 and an uppermost part of longitudinally extensive member 10.

Thus, the path can extend along substantially the whole length of the cup member 40. In some preferred configurations, the length of the skirt portion 42 can be at least equal to the maximum lateral dimension of the longitudinally extensive member 10 (which dimension is the diameter when the longitudinally extensive member 10 is generally cylindrical) proximate the cup member 40. In particular, the length of the skirt portion 42 can be at least twice the said maximum lateral dimension of the longitudinally extensive member 10. From aperture 56 the path extends via circumferential space 52 and aperture 54. It is noted that apertures 54 and 56 are not necessarily aligned. The path can therefore extend circumferentially around boss portion 32D from a respective aperture 56 to an aperture 54 (and vice versa).

The restricted size of the path can be seen in the small dimension of the circumferential gap 48, apertures 54 and 56 and circumferential space 52.

In some preferred embodiments of the invention, with the aim of further minimising any passage of liquid fuel from the body of fuel 14 to the internal volume 26 of the longitudinally extensive member, the said path can be made still more indirect. In these embodiments a barrier ring 58, or, more preferably, a plurality of barrier rings 58, can be arranged in the circumferential gap 48. The, or each, barrier ring 58 can extend almost wholly around the external periphery of the upper portion 10T of the longitudinally extensive member 10. The or each barrier ring 58 can include an external surface 58e which contacts the internal surface 42A of the skirt 42 and an internal surface 58i which contacts the external surface 42A of the skirt 42. Where the upper portion 10T of the longitudinally extensive member 10 and the skirt 42 are substantially cylindrical, the, or each, barrier ring can be substantially annular. The, or each, barrier ring 58 can include a gap or aperture 60 which is of relatively small dimension with respect to the circumferential length of the barrier ring 58. Each aperture 60 can have a maximum width dimension 60d in the range of from about 0.5 mm to abut 3 mm, preferably about 0.5 mm to 2 mm and in particular about 1 mm.

Conveniently, the barrier ring 58 can be received in a circumferential groove 62, or each barrier ring 58 can be received in a respective circumferential groove 62, formed in upper portion 10T of the longitudinally extensive member 10.

The, or each, barrier ring 58 is configured to prevent the passage of any liquid fuel which may be present in circumferential gap 48 other than through its aperture 60. The size of the aperture 60 is small and hence the passage of any liquid fuel along a path from the body of liquid fuel 14 to the aperture 56 through the circumferential gap 48 is restricted. In some particularly preferred embodiments where a plurality of barrier rings 58 is provided, the respective apertures 60 can be rotationally offset or staggered. For example, where four barrier rings 58 are provided, the respective apertures 60 can be arranged at about 90° (i.e. about one quarter turn) to the apertures 60 of adjacent barrier rings 58. Because the respective apertures 60 are not linearly aligned the path of any liquid fuel 14 which may be in the circumferential gap 48 becomes very indirect in terms of reaching the aperture 56. In these ways, the likelihood of any liquid fuel 14 reaching the aperture 56 becomes minimal.

It can be appreciated that the presence of the aperture or apertures 60 in the barrier ring(s) 58 provides a path for air and fuel vapour so that the internal space 26 of the longitudinally extensive member 10 and the headspace 16 can remain at all times in communication and therefore at the same pressure. In this way, the respective second sides of the pressure sensors 18, 20 can always be at the same pressure as the headspace 16.

As noted above, since there is a communication path for air and fuel vapour between the headspace 16 and the internal volume 26, it is possible that a small amount of fuel vapour might condense to form liquid fuel within the internal volume 26. Such condensed fuel will, of course, flow downwardly within the internal volume of the longitudinally extensive member 10. The advantage of the presence of the conduit 24 extending from the respective second sides of the pressure sensors 18, 20 to an upper part of the internal volume 26 can thus be appreciated, in that (with the exception of any extremely minimal amount of fuel which may condense within the conduit 24) contact of the condensed fuel with the respective second sides of the pressure sensors 18, 20 is prevented. For similar reasons, encasing the pressure sensors 18, 20, and colour sensing device 22 in a potting compound can be advantageous in preventing contact thereof with such condensed fuel as could potentially accumulate at the lower regions of the internal volume 26.

An advantage of the constructions described in relation to above embodiments can be seen in that, from the headspace 16 any path which liquid fuel could in theory follow from the headspace 16 to the internal volume 26 is of restricted, or constricted, dimensions and has convoluted course. In this way, liquid fuel 14 is substantially, or entirely, prevented from escaping from the headspace 16 and entering internal volume 26. There is thus substantially no possibility of liquid fuel 14 passing along said path to reach the first and second sensors 18, 20 or the colour sensing device 22.

An advantage of the constructions described in relation to above embodiments can be seen in that can also be noted in that the pathway which provides communication between the internal volume 26 and the headspace 16, such that they are maintained at the same pressure, is never required to pass outside the confines of the tank compartment 12. Thus there can be no part of the pathway (such as an externally arranged pipe or conduit) which is left unprotected outside the tank compartment 12. Inadvertent damage to any such externally arranged conduit is obviated, since no such conduit exists. Also, removal of the longitudinally extensive member 10 for repair or maintenance is facilitated since the above described constructions provide no feature of, or attached externally to, the longitudinally extensive member 10 which obstructs its removal.

The apparatus 100 of the present invention includes two pressure sensors 18, 20 which are spaced apart by a known distance. When the apparatus 100 is in its position of use in the tank compartment 12, the vertical separation of the two pressure sensors is therefore known. In a typical arrangement, the vertical spacing of the first and second pressure sensors 18, 20 may be less than about 200 mm, for example 160 mm.

Each pressure sensor determines the pressure of the fluid in its immediate environment (that is, at the particular depth at which that sensor is located) relative to a common reference pressure. Thus each pressure sensor measures the pressure of the fluid at any given time in relation to the same reference pressure, which in preferred embodiments is the pressure in the headspace 16 at the time of measurement. From the output of the first and second pressure sensors 18, 20 the data processing device 68 can determine the density of the fuel 14 in the tank compartment 12. The calculation of density based on pressure measurements from two pressure sensors at known vertical spacing in a fluid and measuring relative to a common reference pressure is, as such, well known. From the determined density the data processing device 68 can make an identification of the fluid contained in the tank compartment 12, based, for example, on reference density data stored by the data processing device. Given that the density of the fuel 14 can vary with temperature, data processing device 68 can also include output from temperature probe or sensor 66 in determining the identity of the fuel 14.

At least (but not exclusively) in cases where fuels may have the same or similar densities, the data processing device 68 may use data from the colour sensing device 22 in determining the identity of the fuel 14. For example, the colour sensing device 22 may provide an output based on an absorbance spectrum of the fuel in the tank compartment 12. The data processing device 68 can compare said output from the colour sensing device with stored reference data in order to determine an identity of the fuel in the tank compartment 12.

Data processing device 68 can in some embodiments cooperate or interact with safety interlocking arrangements which can prevent dispensing of fuel from a given tank compartment 12 until the identity of the fuel in the tank compartment has been unequivocally determined, the required content of the fuel in the vessel (e.g. storage tank) into which the fuel is to be dispensed has been determined and the two said determinations are found to be in agreement. Thus the opportunity for operator error can be minimised.

As noted above liquid fuel in the tank compartment 12 is subject to mixing with air on emptying and filling of the tank compartment 12 with liquid fuel and also as a consequence of agitation of the fuel caused by the motion of the vehicle. If bubbles or pockets of air become entrapped or lodged near the liquid fuel contacting faces of the sensors 18, 20, 22, the accuracy of the measurements or readings provided by the sensors can be compromised. Accordingly in the apparatus 100 according to the invention, the longitudinally extensive member 10 is configured to minimise or avoid completely the presence of such bubbles or pockets of air at the sensors 18, 20, 22. In particular, in embodiments of the apparatus 100, the longitudinally extensive member 10 is configured in the area of sensors 18, 20, 22, to provide an escape path for any bubbles or pockets of air by which any such bubbles or pockets of air can move away from the respective sensors 18, 20, 22. Thus, in some preferred embodiments the sensors 18, 20, 22 and the longitudinally extensive member can be configured such that the liquid fuel contacting surfaces thereof are arranged in a generally vertical orientation. These contacting surfaces thus cannot themselves act to trap bubbles or pockets of air against them. Also, the longitudinally extensive member 10 can, in preferred embodiments, be configured to avoid ledges or overhangs in the area above and around the sensors 18, 20, 22 which could act to trap pockets or bubbles of air. In the embodiment shown in FIG. 7, the longitudinally extensive member 10 can include one or more longitudinally extending channels 230 formed inwardly of the surface of the longitudinally extending member 10 and which can intersect a recess or well 220 in which a respective sensor 18, 20, 22 is mounted. The channels 230 can act as a flow path for bubbles or pockets of air away from a liquid fuel contacting surface of the respective sensor 18, 20, 22. Where the fluid contacting surface of the respective sensor 18, 20, 22 is at a different radial depth (with respect to the surface of the longitudinally extensive member 10) from a floor 232 of a respective channel an inclined linking land such as lands 234 in FIG. 7 can extend between liquid fuel contacting surface of the sensor 18, 20, 22 and the respective floor 232 of channel 230. Inclined land 234 can thus form a flow path for any air pockets or bubbles between the sensor surface and channel 230 so that such pockets or bubbles can flow away from the sensor.

It may be further noted that, although a very convenient arrangement, it is not an essential requirement that the fuel contacting surfaces of the sensors 18, 20, 22 are arranged generally vertically, provided that the respective surfaces (and surrounding parts of the longitudinally extensive member 10 as necessary) are configured to permit the movement of bubbles or pockets of air away from the liquid fuel contacting surface of the sensor. The liquid contacting surfaces of the sensors can thus adopt any configuration (e.g. angle inclination) which permits or (more preferably) which promotes the movement of bubbles or pockets of air which may be present away from the sensor surface.

Throughout the description and claims of this specification, the words "comprise" and "contain" and variations of them mean "including but not limited to", and they are not intended to (and do not) exclude other moieties, additives, components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The invention is not restricted to the details of any foregoing embodiments. The invention extends to any novel one, or any novel combination, of the features disclosed in this specification (including any accompanying claims, abstract and drawings), or to any novel one, or any novel combination, of the steps of any method or process so disclosed.

The reader's attention is directed to all papers and documents which are filed concurrently with or previous to this specification in connection with this application and which are open to public inspection with this specification, and the contents of all such papers and documents are incorporated herein by reference.

The invention claimed is:

1. An apparatus for determining the identity and/or quantity of a liquid fuel contained in a fuel transporting tank of a fuel transporting vehicle, the apparatus comprising:
    a longitudinally extensive member having a first end and a second end, and a mounting arrangement configured for mounting in use of the longitudinally extensive member within and in fixed relation to the tank such that an immersion portion of the longitudinally extensive member extending upwardly from said second end is immersed in the liquid fuel in the tank, said longitudinally extensive member defining an internal volume from which liquid fuel in the tank is, in use, excluded, wherein said member further comprises:
    first and second pressure sensors spaced apart by a fixed distance, each said pressure sensor having a face exposed in use to the local hydrostatic pressure of the liquid fuel in the tank, and
    a colour sensing device comprising a light emitter and a light detector configured to detect light from the emitter, said emitter and detector being arranged such that in use light from the emitter incident on the detector passes through said liquid fuel in the tank;
    the apparatus further comprising a data processing device configured to determine the identity of the liquid fuel based on said pressure measurements from said first and second pressure sensors and colour data from said colour sensing device,
    wherein said internal volume communicates externally of the longitudinally extensive member only with a headspace of the tank.

2. The apparatus as claimed in claim 1 wherein the longitudinally extensive member comprises at least one wall having any outer surface defining the outer surface of the longitudinally extensive member and an inner surface defining said internal volume.

3. The apparatus as claimed in claim 2 wherein said wall is generally cylindrical.

4. The apparatus as claimed in claim 1 wherein the respective first and second pressure sensors measure a pressure of the liquid fuel at a depth in the tank determined by their location and relative to a common reference pressure.

5. The apparatus as claimed in claim 4 wherein the common reference pressure is the pressure of the headspace.

6. The apparatus as claimed in claim 5 further comprising a conduit extending in said internal volume from an internal side of the respective pressure sensors and having an opening arranged at an upper part of said internal volume by which the conduit interior is open to the internal volume.

7. The apparatus as claimed in claim 6 wherein said conduit comprises a pipe or tube section which extends in said internal volume from a lower part to an upper part thereof.

8. The apparatus as claimed in claim 1 further comprising
a cover member arranged in confronting relation to an external surface of an upper portion of the longitudinally extensive member, the cover member and the said external surface defining therebetween a through passage extending from a local opening at a lower part of said cover member to an aperture formed at an upper part of said longitudinally extensive member by which aperture the internal volume is in communication with said through passage,
the exterior of the longitudinally extensive member and the internal volume communicating via said through passage and said aperture formed at an upper part of said longitudinally extensive member such that the pressure of the internal volume is the same as the pressure of the exterior of the longitudinally extensive member.

9. The apparatus as claimed in claim 8 further comprising a mounting head assembly securable to an external part of said fuel transporting tank and by which the longitudinally extensive member can be mounted to the fuel transporting tank.

10. The apparatus as claimed in claim 9 wherein said mounting head assembly includes a boss portion directed inwardly with respect to the transporting tank and wherein said longitudinally extensive member is mounted to said boss portion.

11. The apparatus as claimed in claim 10 wherein said boss portion includes an aperture opening to said internal volume of the longitudinally extensive member and through which said internal volume communicates with the aperture formed at an upper part of said longitudinally extensive member.

\* \* \* \* \*